(12) United States Patent
Colombo (10) Patent No.: US 12,523,435 B2
(45) Date of Patent: Jan. 13, 2026

(54) DEVICE AND METHOD FOR RESTORING THE TUBE-TO-TUBE SHEET WELD JOINTS IN A SHELL-AND-TUBE EQUIPMENT

(71) Applicant: Alfa Laval Olmi S.p.A, Suisio (IT)

(72) Inventor: Marco Colombo, Monza (IT)

(73) Assignee: ALFA LAVAL OLMI S.P.A., Suisio (IT)

( * ) Notice: Subject to any disclaimer, the term of this patent is extended or adjusted under 35 U.S.C. 154(b) by 17 days.

(21) Appl. No.: 18/024,618

(22) PCT Filed: Aug. 30, 2021

(86) PCT No.: PCT/EP2021/073877
§ 371 (c)(1),
(2) Date: Mar. 3, 2023

(87) PCT Pub. No.: WO2022/049029
PCT Pub. Date: Mar. 10, 2022

(65) Prior Publication Data
US 2024/0027146 A1    Jan. 25, 2024

(30) Foreign Application Priority Data
Sep. 4, 2020    (EP) .................................... 20425035

(51) Int. Cl.
*B23K 31/00* (2006.01)
*B23K 31/02* (2006.01)
(Continued)

(52) U.S. Cl.
CPC ................ *F28F 9/18* (2013.01); *B23K 31/02* (2013.01); *B23P 6/00* (2013.01); *B23K 2101/14* (2018.08)

(58) Field of Classification Search
CPC ....................... B23K 11/0935; B23K 2101/06; B23K 31/02; B23K 9/0288; F16L 23/032; F16L 23/036; F16L 41/084
See application file for complete search history.

(56) References Cited

U.S. PATENT DOCUMENTS 137,977 A * 4/1873 Theaker .................. B60B 17/00
295/37
187,394 A * 2/1877 Leland .................... F16L 19/04
285/354
(Continued)

FOREIGN PATENT DOCUMENTS

CN      105269122 A    1/2016
EP      1 331 465-81   2/2012
(Continued)

OTHER PUBLICATIONS

Fwb, https://www.fwb.co.uk/pipeline/steel-pipe-fittings/black-malleable-fittings/gf-black-malleable-hex-nipple, wayback machine May 2021 (Year: 2021).*
(Continued)

*Primary Examiner* — Erin B Saad
(74) *Attorney, Agent, or Firm* — Birch, Stewart, Kolasch & Birch, LLP (57) ABSTRACT

A device for repairing damaged tube-to-tube sheet weld joints in a shell-and-tube equipment is disclosed. The device consists in a tubular connection element oriented along a central axial direction and includes at least one inner wall, designed to enclose an inner conduit for the passage, along the central axial direction, of at least one fluid processed by the shell-and-tube equipment, and at least one outer wall, which surrounds the inner wall. The tubular connection element is provided, at one end thereof, with at least one first connecting portion for the connection, through a butt-
(Continued)

welded joint, to one corresponding tube of the shell-and-tube equipment and, on one side thereof, with at least one second.

23 Claims, 12 Drawing Sheets

(51) Int. Cl.
    *B23P 6/00*         (2006.01)
    *F28F 9/18*         (2006.01)
    *B23K 101/14*    (2006.01)

(56) References Cited

U.S. PATENT DOCUMENTS

| | | | | |
|---|---|---|---|---|
| 228,423 | A * | 6/1880 | Tucker | F16B 37/14 411/372.5 |
| 239,778 | A * | 4/1881 | Hewitt | B25G 3/34 76/103 |
| 526,260 | A * | 9/1894 | Reaser | F16L 3/00 126/318 |
| 536,204 | A * | 3/1895 | Harrington | B29C 45/2618 249/105 |
| 540,336 | A * | 6/1895 | Rubenstein | F16L 41/086 251/145 |
| 689,624 | A * | 12/1901 | Ryan | F16L 21/04 285/346 |
| 944,748 | A * | 12/1909 | Smith et al. | F16L 55/178 285/413 |
| 954,549 | A * | 4/1910 | Turner | F16L 19/0218 285/379 |
| 975,026 | A * | 11/1910 | Falk | A24D 1/14 131/348 |
| 1,450,956 | A * | 4/1923 | Gottsch | E03C 1/284 137/247.49 |
| 1,594,434 | A * | 8/1926 | Trumble | B60B 35/163 74/607 |
| 1,608,180 | A * | 11/1926 | Nathanson | B21C 37/29 72/341 |
| 2,374,733 | A * | 5/1945 | Crawford | F16L 41/084 285/55 |
| 3,452,636 | A * | 7/1969 | Cohen | F16B 43/001 403/376 |
| 3,962,767 | A | 6/1976 | Byerley et al. | |
| 4,103,738 | A | 8/1978 | Aydelott et al. | |
| 4,299,254 | A * | 11/1981 | Zahid | F15B 1/20 138/30 |
| 4,344,458 | A * | 8/1982 | Zahid | F15B 1/165 138/30 |
| 4,555,129 | A * | 11/1985 | Davlin | F16L 41/084 285/422 |
| 4,615,477 | A | 10/1986 | Spada et al. | |
| 6,186,356 | B1 * | 2/2001 | Berkley | F17C 1/00 220/582 |
| 6,247,231 | B1 | 6/2001 | Findlan et al. | |
| 6,960,333 | B2 | 11/2005 | Blanda, Jr. et al. | |
| 7,237,601 | B2 | 7/2007 | Birk et al. | |
| 7,547,859 | B2 | 6/2009 | Gandy et al. | |
| 8,628,286 | B2 * | 1/2014 | Duvekot | E04B 1/66 411/371.2 |
| 10,859,189 | B2 * | 12/2020 | Wirth | F01N 13/1805 |
| 2005/0194389 | A1 * | 9/2005 | Lai | F24D 3/1016 220/723 |
| 2007/0107885 | A1 * | 5/2007 | Guillaume | F28D 7/16 165/158 |
| 2009/0065185 | A1 | 3/2009 | Jekerle | |
| 2009/0114197 | A1 * | 5/2009 | Darnell | F02M 25/00 123/585 |
| 2014/0165984 | A1 * | 6/2014 | Colby | F41B 11/723 124/73 |
| 2015/0165568 | A1 | 6/2015 | Means et al. | |
| 2016/0288240 | A1 * | 10/2016 | Yoo | B23K 9/0284 |
| 2017/0191469 | A1 * | 7/2017 | Dom | F03G 7/0641 |
| 2017/0211906 | A1 * | 7/2017 | Colby | F41B 11/723 |
| 2017/0254428 | A1 * | 9/2017 | Barnes | F17C 1/00 |
| 2019/0234689 | A1 * | 8/2019 | Singh | F28D 7/08 |
| 2019/0353433 | A1 | 11/2019 | Manenti | |
| 2019/0390820 | A1 * | 12/2019 | Wang | F17C 1/00 |
| 2020/0122502 | A1 * | 4/2020 | Trouw | B60B 21/12 |
| 2021/0003355 | A1 * | 1/2021 | Manenti | F28D 7/16 |
| 2021/0332920 | A1 * | 10/2021 | Yang | F16L 23/10 |
| 2023/0024510 | A1 * | 1/2023 | Bodas | B01J 19/0013 |
| 2024/0027146 | A1 * | 1/2024 | Colombo | F28F 9/18 |

FOREIGN PATENT DOCUMENTS

| | | |
|---|---|---|
| EP | 2 963 376 A1 | 1/2016 |
| WO | WO 99/10696 A1 | 3/1999 |
| WO | WO 01/48434 A1 | 7/2001 |
| WO | WO 2006/093907 A2 | 9/2006 |
| WO | WO 2006/093907 A3 | 9/2006 |
| WO | WO 2007/082515 A1 | 7/2007 |
| WO | WO 2019/115583 A1 | 6/2019 |

OTHER PUBLICATIONS

"Heat exchanger Repair", YouTube, Feb. 15, 2017, https://www.youtube.com/watch?v=7LNErQO6IBI.

Decision to grant a European patent pursuant to Article 97(1) EPC, issued in Priority Application No. 20425035.1, dated Dec. 22, 2022.

European Office Action, issued in Priority Application No. 20425035.1, dated Oct. 17, 2022.

Extended European Search Report, issued in Priority Application No. 20425035.1, dated Feb. 15, 2021.

International Search Report, issued in PCT/EP2021/073877, dated Oct. 14, 2021.

Written Opinion of the International Searching Authority, issued in PCT/EP2021/073877, dated Oct. 14, 2021.

\* cited by examiner

DEVICE AND METHOD FOR RESTORING THE TUBE-TO-TUBE SHEET WELD JOINTS IN A SHELL-AND-TUBE EQUIPMENT

FIELD OF THE INVENTION

The present invention refers in general to a device and a method for repairing damaged tube-to-tube sheet weld joints in a shell-and-tube equipment and, more specifically, to a device and a method for restoring the original butt weld between a tube and the respective tube sheet in a shell-and-tube equipment with tubes welded to the tube sheet by the so called IBW (acronym for "Internal Bore Welding") technology.

Background of the Invention

A shell-and-tube equipment usually comprises a plurality of tubes arranged parallel to each other in order to form at least one tube bundle. The tube bundle is axially inserted into a shell having an elongated shape and a cylindrical geometry. A shell-and-tube equipment can be used, for example, as a heat exchanger to transfer heat between at least two fluids. In a typical configuration of a shell-and-tube equipment, a first fluid is fed through one or more first inlet pipes and flows inside the tube bundle, whereas a second fluid is fed through at least one second inlet pipe and flows inside the shell in order to perform heat exchange with the first fluid through the walls of the tubes of the tube bundle.

In a shell-and-tube equipment the tubes of the tube bundle are usually connected, at least at one end thereof, to a tube sheet by respective welded joints. Since the fluids entering the shell-and-tube equipment are usually at a high temperature and/or can be corrosive fluids, the tube-to-tube sheet welded joints are the most critical joints in a shell-and-tube equipment. Actually, these fluids can locally damage the tube-to-tube sheet welded joints, for example due to overheating or erosion. Additionally, the tubes too of the tube bundle may need to be removed and replaced in case of damages thereof.

Figure 1:
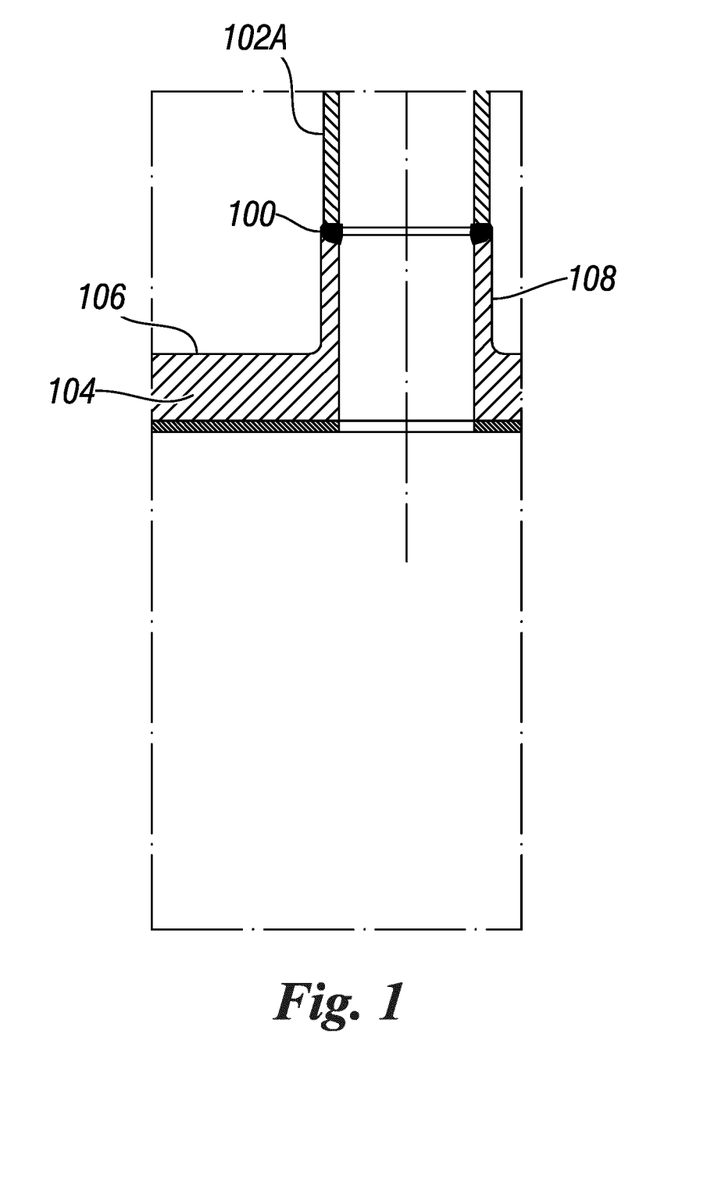
FIG. 1 shows a conventional butt-welded joint between a tube and the tube sheet of an IBW shell-and-tube equipment.

In a conventional shell-and-tube equipment the tubes are inserted through the tube sheet and jointed to one of the tube sheet faces by fillet welding. In some equipment the tubes can also be expanded. In shell-and-tube equipment for special applications, e.g. heat exchangers for high heat flux application, the tube-to-tube sheet joints can be obtained through the so called IBW (acronym for "Internal Bore Welding") technology. A conventional joint of this type is shown, for example, in the attached FIG. 1. According to this IBW technology and with reference to FIG. 1, the welded joint 100 between each tube 102A and the respective tube sheet 104 is located in the internal shell side 106 of the tube sheet 104. More precisely, the welded joint 100 is a butt-welded joint obtained between one end of the tube 102A and a corresponding tube hub 108, which protrudes from the internal shell side 106 of the tube sheet 104 and which is integrally formed in one piece with said tube sheet 104. The welded joint 100 is manufactured from the internal side of the tube 102A inserting a special welding torch in the bore of the tube hub 108. It should be noted that, in a typical shell-and-tube equipment used as a heat exchanger, butt-welded joints are the most reliable joints between tubes and the tube sheet, especially when hot and/or corrosive fluids are processed by the shell-and-tube equipment.

Figure 2:
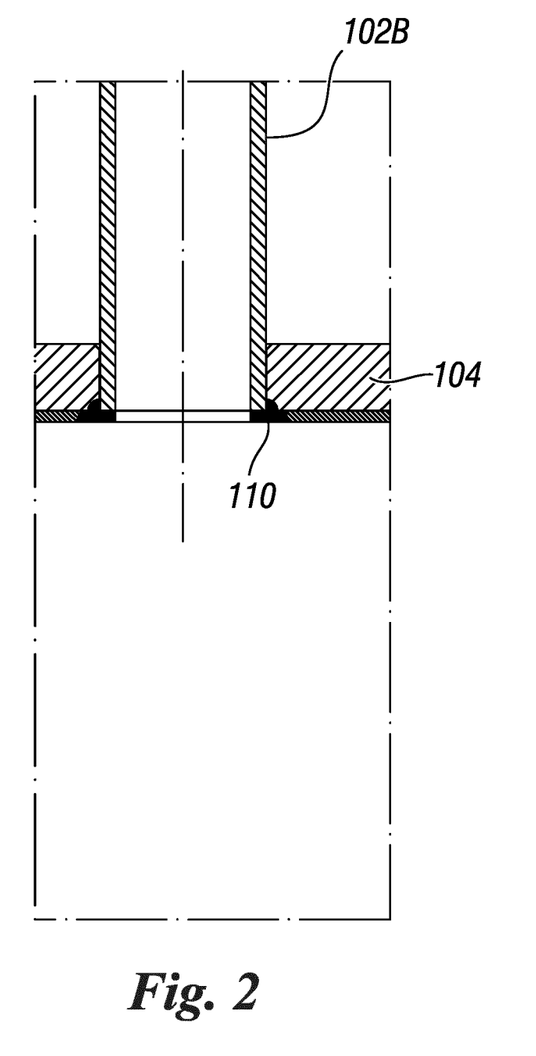
FIG. 2 shows a first possible embodiment, according to the prior art, of a repaired weld joint between a tube and the tube sheet of an IBW shell-and-tube equipment.
Figure 3:
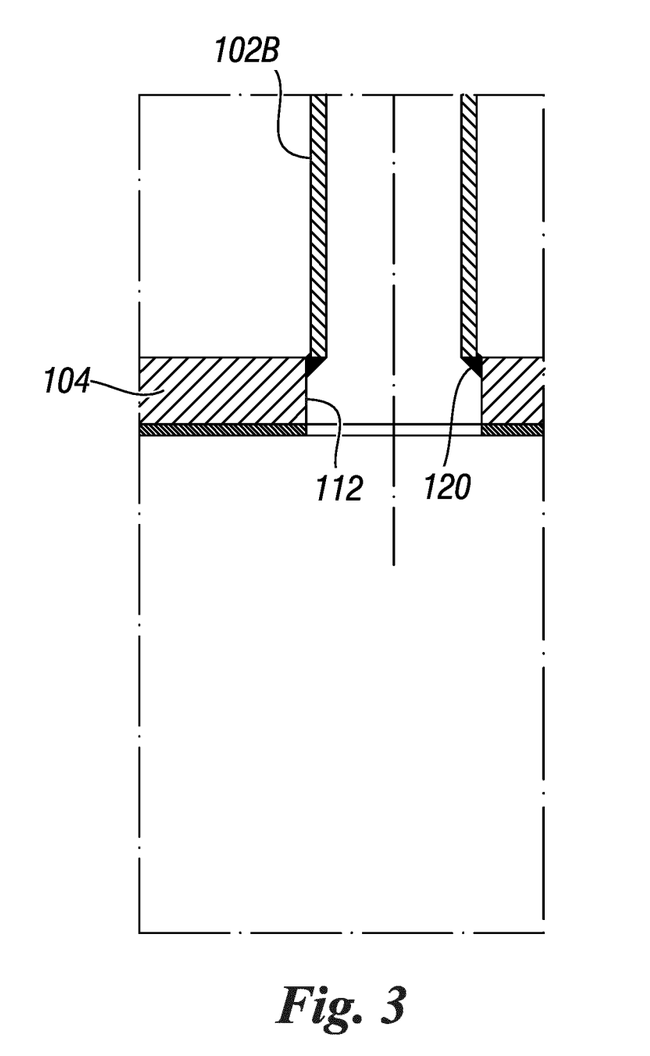
FIG. 3 shows a second possible embodiment, according to the prior art, of a repaired weld joint between a tube and the tube sheet of an IBW shell-and-tube equipment.

In case of tube replacement in a shell-and-tube equipment manufactured with IBW technology, the failed or damaged tube hub is usually removed from the tube sheet through a cutting or machining operation, thus leaving a hole in the tube sheet. However, the most common repairing solutions do not allow to restore the original butt-welded joint between the tube and the tube sheet. For example, in FIG. 2 a first possible repairing solution is shown, wherein a new tube 102B is fully inserted in the hole 112 made in the tube sheet 104, but the original butt-welded tube-to-tube sheet joint 100 (see FIG. 1) is replaced by a conventional corner joint 110. In FIG. 3 a second possible repairing solution is shown, wherein a new tube 102B is joined at one end of the hole 112 made in the tube sheet 104, and thus the original butt-welded tube-to-tube sheet joint 100 (see FIG. 1) is replaced by a crevice free corner joint 120. Therefore, according to these known repairing solutions, the original butt-welded tube-to-tube sheet joint 100 is always replaced with a corner joint, which is less reliable than a butt-welded joint.

Further repairing solutions are known in the state of the art. For example, document U.S. Pat. No. 7,547,859 B2 discloses a method for repairing damaged tube-to-tube sheet weld joints wherein the tube is removed from the tube sheet by a cutting or machining operation. The diameter of the resulting hole in the tube sheet should be at least equivalent to the outer diameter of a stub tube to be secured in said hole. This stub tube is press fit or roll expanded in order to secure it in the corresponding tube sheet hole. This stub tube is then welded, at one end thereof, to the tube sheet and is subsequently welded, at the opposite end thereof, to a new tube. However, the joint between the tube and the stub tube is a butt-welded joint, but the opposite joint between the stub tube and the tube sheet is a conventional corner joint, like for example those of the attached FIGS. 2 and 3, and therefore is not a fully reliable joint.

Document U.S. Pat. No. 4,615,477 A discloses a further method for repairing damaged tube-to-tube sheet weld joints, wherein the root portion of an old tube is kept in the tube sheet, whereas the remaining part of this old tube and a portion of the tube sheet too are machined away. The removed portion of the tube sheet forms an area that surrounds the hole wherein the root portion of the old tube is fitted. This area is recessed to form a countersink. A new tube is then inserted in the hole and a weld bead secures the new tube to the tube sheet. The weld bead fills the countersink, but does not form a proper butt-welded joint between the new tube and the root portion of the old tube to which this new tube is in fluid connection.

Finally, documents U.S. Pat. No. 6,247,231 B1 and U.S. Pat. No. 3,962,767 A disclose respective embodiments of sleeves for joining tube pieces together. In both embodiments, the sleeves are configured for being inserted into the tubes and for joining pairs of adjacent tube pieces, without any butt-welded joint between these tube pieces.

SUMMARY OF THE INVENTION

One object of the present invention is therefore to provide a device and a method for restoring the tube-to-tube sheet weld joints in an IBW shell-and-tube equipment which are capable of resolving the drawbacks of the prior art in a simple, inexpensive and particularly functional manner.

In detail, one object of the present invention is to provide a device and a method for restoring the tube-to-tube sheet weld joints in an IBW shell-and-tube equipment which, in case of tube replacement, allow to restore the original butt-welded joint configuration between the tube and the tube sheet.

Another object of the present invention is to provide a device and a method for restoring the tube-to-tube sheet weld joints in an IBW shell-and-tube equipment which allow to perform the welding operations in a simple way and using conventional welding tools.

These objects are achieved according to the present invention by providing a device and a method for restoring the tube-to-tube sheet weld joints in an IBW shell-and-tube equipment as set forth in the attached claims.

Further features of the invention are underlined by the dependent claims, which are an integral part of the present description.

The device according to the present invention for repairing damaged tube-to-tube sheet weld joints in an IBW shell-and-tube equipment consists in a tubular connection element oriented along a central axial direction. The tubular connection element comprises:

- at least one inner wall, designed to enclose an inner conduit for the passage, along the central axial direction, of at least one fluid processed by the shell-and-tube equipment; and
- at least one outer wall, which surrounds the inner wall.

The tubular connection element is provided, at one end thereof, with at least one first connecting portion for the connection, through a butt-welded joint, to one corresponding tube of the shell-and-tube equipment and, on one side thereof, with at least one second connecting portion for the connection, through at least one weld bead, of the tubular connection element to at least one portion of the tube sheet of the shell-and-tube equipment.

The second connecting portion is provided with at least one radially projecting flange, designed to facilitate a root welding, through said at least one weld bead, between the tubular connection element and the tube sheet. This radially projecting flange delimits at least one shaped recess on the outer wall for housing at least a part of the weld bead.

Preferably, the radially projecting flange is an annular flange that circumferentially surrounds the second connecting portion. Consequently, the shaped recess is an annular recess that circumferentially surrounds the second connecting portion.

According to a preferred aspect of the invention, the radially projecting annular flange is integrally made in a single piece with the outer wall and is preferably jointed to the annular recess through one curved wall of predefined radius. The radially projecting flange preferably lies in a first plane that is substantially perpendicular to the central axial direction.

According to another preferred aspect of the invention, the first connecting portion is upwardly inclined toward the central axial direction according to a predefined angle, so as to form a notch at one end of the outer wall to facilitate the butt-welding between the tubular connection element and the tube. More preferably, this angle is defined between the first connecting portion and a second plane in which the upper end of the outer wall lies. This second plane is substantially perpendicular to the central axial direction and the angle is thus preferably comprised between 20° and 40° and is more preferably equal to 30°.

Preferably, the tubular connection element has a circular cross section.

According to a specific embodiment of the device according to the present invention, the inner wall can be internally provided with at least one thickened portion designed to sustain the welding pool and the welding stress. This thickened portion is obtained in proximity of the radially projecting flange and the shaped recess, so as to increase the overall thickness of the tubular connection element at the radially projecting flange and the shaped recess.

The method according to the present invention for repairing damaged tube-to-tube sheet weld joints in a shell-and-tube equipment uses at least one device consisting in a tubular connection element oriented along a central axial direction and comprising at least one inner wall, designed to enclose an inner conduit for the passage, along the central axial direction, of at least one fluid processed by the shell-and-tube equipment, and at least one outer wall, which surrounds the inner wall. The tubular connection element is provided, at one end thereof, with at least one first connecting portion for the connection, through a butt-welded joint, to one corresponding tube of the shell-and-tube equipment and, on one side thereof, with at least one second connecting portion for the connection, through at least one weld bead, of the tubular connection element to at least one portion of the tube sheet of the shell-and-tube equipment. The method comprises the steps of:

- cutting an annular portion of the tube sheet, i.e. the annular portion of the tube sheet that surrounds at least the hub of one old tube to be replaced, so as to obtain a through hole in the tube sheet for the insertion of the tubular connection element;
- removing the old tube from the shell-and-tube equipment;
- inserting a new tube into the shell-and-tube equipment;
- butt-welding the new tube, at one end thereof, to the tubular connection element;
- fitting up the tubular connection element into the through hole; and
- forming a weld bead in a cavity obtained between the tubular connection element and the through hole, so as to obtain a root welding between the tubular connection element and the tube sheet.

Preferably, after the old tube removing step and before the new tube inserting step, at least one machining operation on the through hole is performed, so as to enlarge and/or to shape said through hole for facilitating the tubular connection element fitting up step and/or the weld bead forming step. The tubular connection element is thus fitted up into the through hole in such a way that at least one radially projecting flange provided on the second connecting portion is substantially aligned to the internal shell side of the tube sheet.

Always preferably, the machining operation is performed to form a through hole with at least two different annular sections, wherein the tubular connection element is fitted up into the through hole in such a way that its radially projecting flange is substantially placed at a first annular section with a smaller diameter, whereas at least one shaped recess, delimited by the radially projecting flange, is substantially placed at a second annular section with a greater diameter. Accordingly, the weld bead forming step can comprise:

- a first weld bead forming sub-step, wherein a first weld bead is formed between the radially projecting flange and the first annular section with a smaller diameter;
- at least one second weld bead forming sub-step, wherein at least one second weld bead, having a thickness which is smaller than the thickness of the tube sheet, is formed between the shaped recess and the through hole; and
- at least one third weld bead forming sub-step, wherein at least one third weld bead is formed between the shaped recess and the through hole, in such a way that the whole weld bead has a thickness which is substantially equal to the thickness of the tube sheet.

BRIEF DESCRIPTION OF THE DRAWINGS

The features and advantages of a device and a method for restoring the tube-to-tube sheet weld joints in an IBW shell-and-tube equipment according to the present invention will be clearer from the following exemplifying and non-limiting description, with reference to the enclosed schematic drawings, in which.

DETAILED DESCRIPTION OF THE INVENTION

Figure 4:
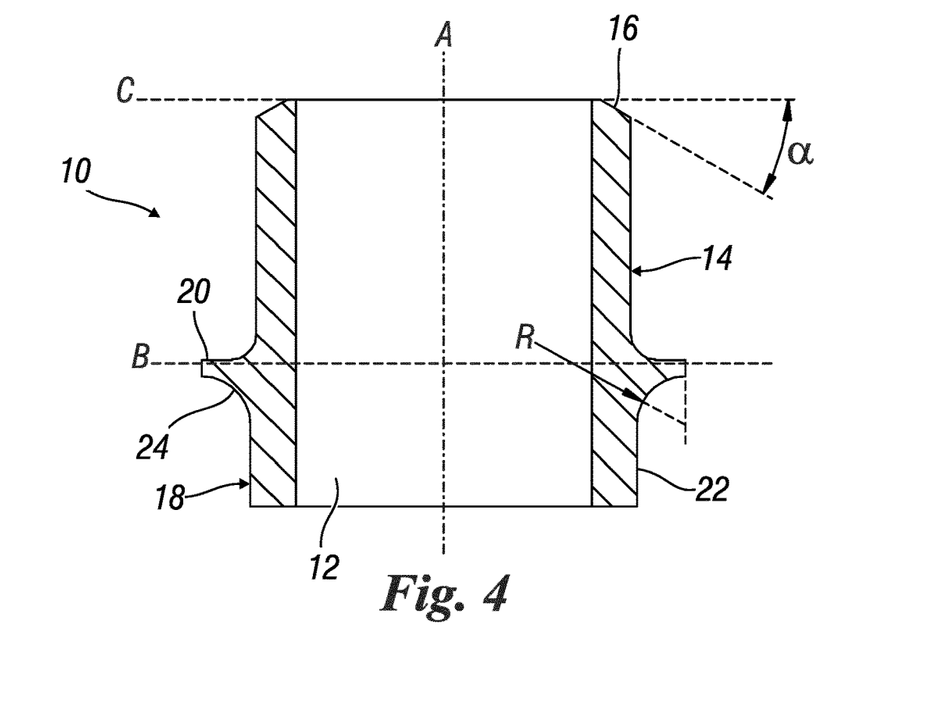
FIG. 4 shows a first embodiment of a device according to the present invention for repairing damaged tube-to-tube sheet weld joints in a shell-and-tube equipment.
Figure 5:
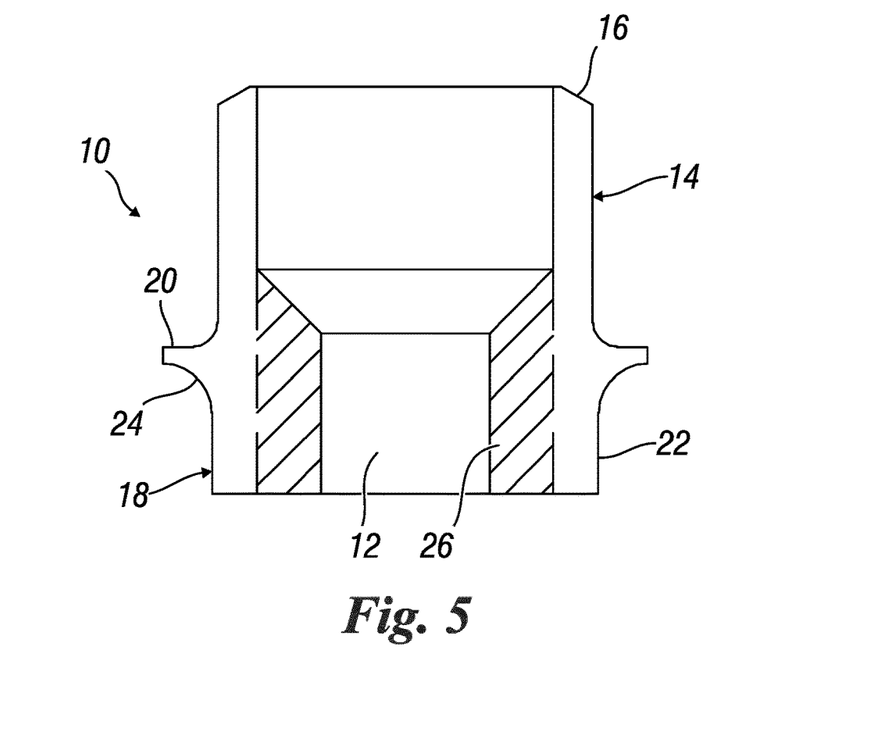
FIG. 5 shows a second embodiment of a device according to the present invention for repairing damaged tube-to-tube sheet weld joints in a shell-and-tube equipment.
Figure 6:
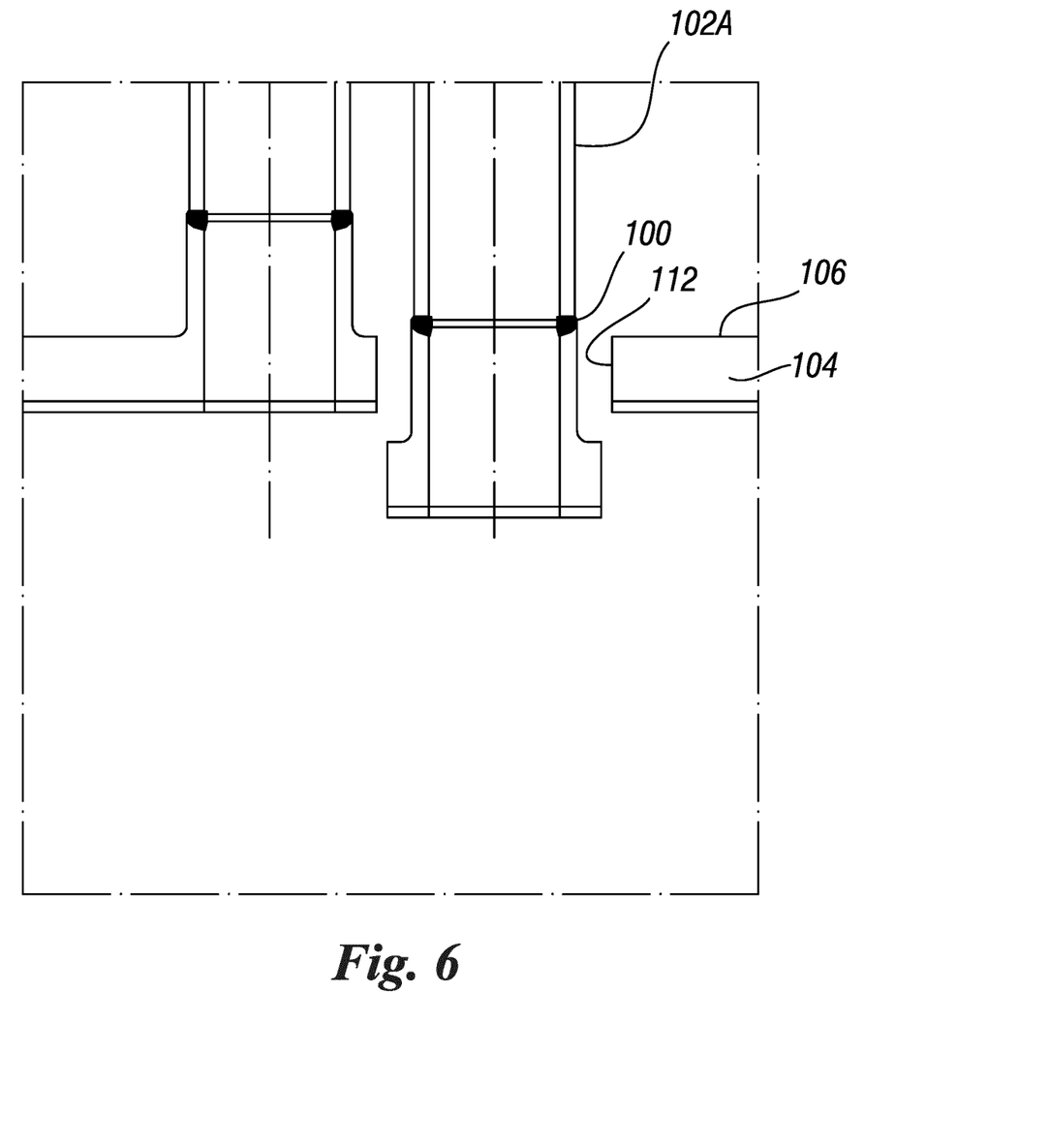
FIGS. 6-13 respectively show the sequential steps for performing a method according to the present invention for repairing damaged tube-to-tube sheet weld joints in a shell-and-tube equipment.

With specific reference to FIGS. 4 and 5, two preferred embodiments of a device according to the present invention for repairing damaged tube-to-tube sheet weld joints in a shell-and-tube equipment are shown. The device basically consists in a tubular connection element 10 oriented along a central axial direction A.

With the term "tubular" it is intended that the cross section of the connection element 10 can have the shape of any closed curve. Preferably, the cross section of this connection element 10 is a circular cross section, so as to be compatible with the circular cross section of the majority of the tubes of a conventional shell-and-tube equipment. However, other shapes of this cross section can be provided, for example an elliptic cross section or cross sections in the form of closed polygons, e.g. square, hexagonal, octagonal, etc.

The connection element 10 comprises at least one inner wall 12, designed to enclose an inner conduit for the passage, along the central axial direction A, of at least one fluid processed by the shell-and-tube equipment. The connection element 10 further comprises at least one outer wall 14, which surrounds the inner wall 12. The tubular connection element 10 is provided, at one end thereof, with at least one first connecting portion for the connection, through a butt-welded joint 100, to one corresponding tube of the shell-and-tube equipment. On one side thereof, the tubular connection element 10 is then provided with at least one second connecting portion 18 for the connection, through at least one weld bead, of said tubular connection element 10 to at least one portion of the tube sheet 104 (see FIGS. 6 to 13) of the shell-and-tube equipment when a replacement of an old (damaged) tube 102A of this shell-and-tube equipment has to be made.

According to the invention, the second connecting portion 18 obtained on one side of the outer wall 14 of the connection element 10 is provided with at least one radially projecting flange 20. This radially projecting flange 20 is designed to facilitate the root welding, through the aforementioned weld bead, between the tubular connection element 10 and the tube sheet 104 of the shell-and-tube equipment. Additionally, the radially projecting flange 20 delimits at least one shaped recess 22 on the outer wall 14 of the connection element 10. This shaped recess 22 is designed for housing at least a part of the weld bead.

As it will be better explained hereinafter, the radially projecting flange 20 has thus the function of a "spacer" that allows to increase the distance between the through hole 112, obtained in the tube sheet 104, and the shaped recess 22, obtained on the outer wall 14 of the connection element 10. Consequently, in this "enlarged" space or cavity between the through hole 112 and the outer wall 14 of the connection element 10 a greater, and therefore stronger, weld bead can be obtained with respect to replacement hubs and/or stub tubes according to the prior art. In other words, this "enlarged" space allows the insertion therein of a conventional welding tool, e.g. a welding torch such as that schematically shown in FIG. 9 and indicated with reference numeral 200, so as to perform a stronger and more accurate root welding between the connection element 10 and the tube sheet 104 with respect to the welding procedures according to the prior art.

Preferably, the radially projecting flange 20 of the connection element 10 is an annular flange that circumferentially surrounds the second connecting portion 18 of the outer wall 14 of said connection element 10. Consequently, the shaped recess 22 too is preferably an annular recess that circumferentially surrounds the second connecting portion 18 of the outer wall 14 of the connection element 10. In other words, both the radially projecting flange 20 and the shaped recess 22 extend along the entire circumferential surface of the second connecting portion 18, thus allowing to obtain a continuous annular weld bead around said second connecting portion 18.

According to this embodiment of the connection element 10, the radially projecting annular flange 20 can also be integrally made in a single piece with the outer wall 14 and can be jointed to the annular recess 22 through one curved wall 24 of predefined radius R. This feature may improve the mechanical strength of the annular flange 20. Additionally, this radially projecting flange 20 can lie in a first plane B that is substantially perpendicular to the central axial direction A of the connection element 10.

The first connecting portion 16 of the outer wall 14 of the connection element 10, that is, the portion of the connection element 10 designed to restore the butt-welded joint 100 with the new tube 102B, can be upwardly inclined toward the central axial direction A of the connection element 10 according to a predefined angle α. This feature allows to obtain a notch at one end of the outer wall 14, i.e. at the first connecting portion 16 thereof, so as to facilitate the butt-welding between the tubular connection element 10 and the new tube 102B, especially in the event that said new tube 102B too is provided in turn with a corresponding notch (visible for example in FIG. 7). Actually, these opposite notches, when jointed together, form an annular space for housing the bead of the butt-welded joint 100, as shown for example in FIGS. 8 to 13).

The angle α is defined between the first connecting portion 16 and a second plane C in which the upper end of the outer wall 14 lies. This second plane C is substantially perpendicular to the central axial direction A of the connection element 10. Preferably, the angle α is comprised between 20° and 40°. More preferably, the angle α is equal to 30°. However, it should be pointed out that the angle α can vary in relation to the actual joint geometry.

According to the embodiment of the connection element 10 shown in FIG. 5, the inner wall 12 of said tubular connection element 10 can be internally provided with at least one thickened portion 26 designed to sustain the welding pool and the welding stress. Actually, after the welding operation, this thickened portion 26 must be machined away to restore the original inner diameter of the tubular connection element 10, since reductions of the passage area of said tubular connection element 10 are usually not allowed. This thickened portion 26 has thus the purpose of providing more material in the connection element 10 for welding support. This thickened portion 26 is obtained in proximity of the radially projecting flange 20 and of the shaped recess 22, so as to increase the overall thickness of the tubular connection element 10 at said projecting flange 20 and said shaped recess 22.

The function of the thickened portion 26 is that of strengthen the second connecting portion 18 of the outer wall 14 of the connection element 10 during the root welding operations. Actually, when the root welding operations are finished and the connection element 10 is finally coupled with the tube sheet 104, this thickened portion 26 is machined away to restore the original internal diameter of the inner wall 12 of the tubular connection element 10, since this internal diameter should be equal to the internal diameter of the new tube 102B which is butt-welded to said tubular connection element 10.

Figure 7:
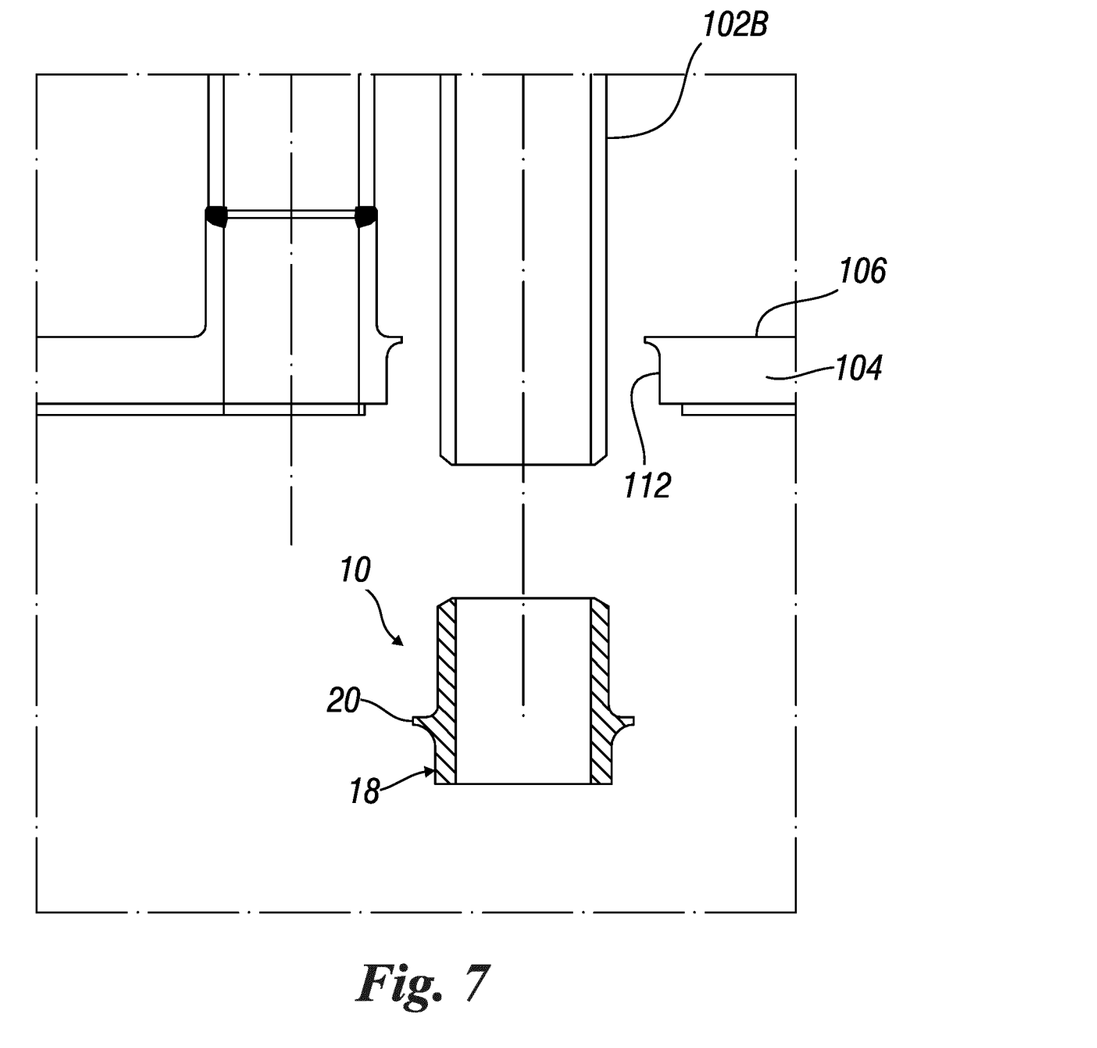

The method for repairing damaged tube-to-tube sheet weld joints in a shell-and-tube equipment using a tubular connection element 10 such as that described so far is thus the following. A first step of the method, shown in FIG. 6, consists in the cut of an annular portion of the tube sheet 104, i.e. the annular portion of the tube sheet 104 that surrounds the hub or root of the old tube 102A to be replaced. This cutting operation, that can be performed with any suitable cutting tool, allows do obtain a through hole 112 in the tube sheet 104 for the insertion of the tubular connection element 10. Once the cutting operation is finished, the old tube 102A, together with its hub or root portion, can be removed from the shell-and-tube equipment and a new tube 102B can be subsequently inserted into the shell-and-tube equipment (as shown in FIG. 7).

Figure 8:
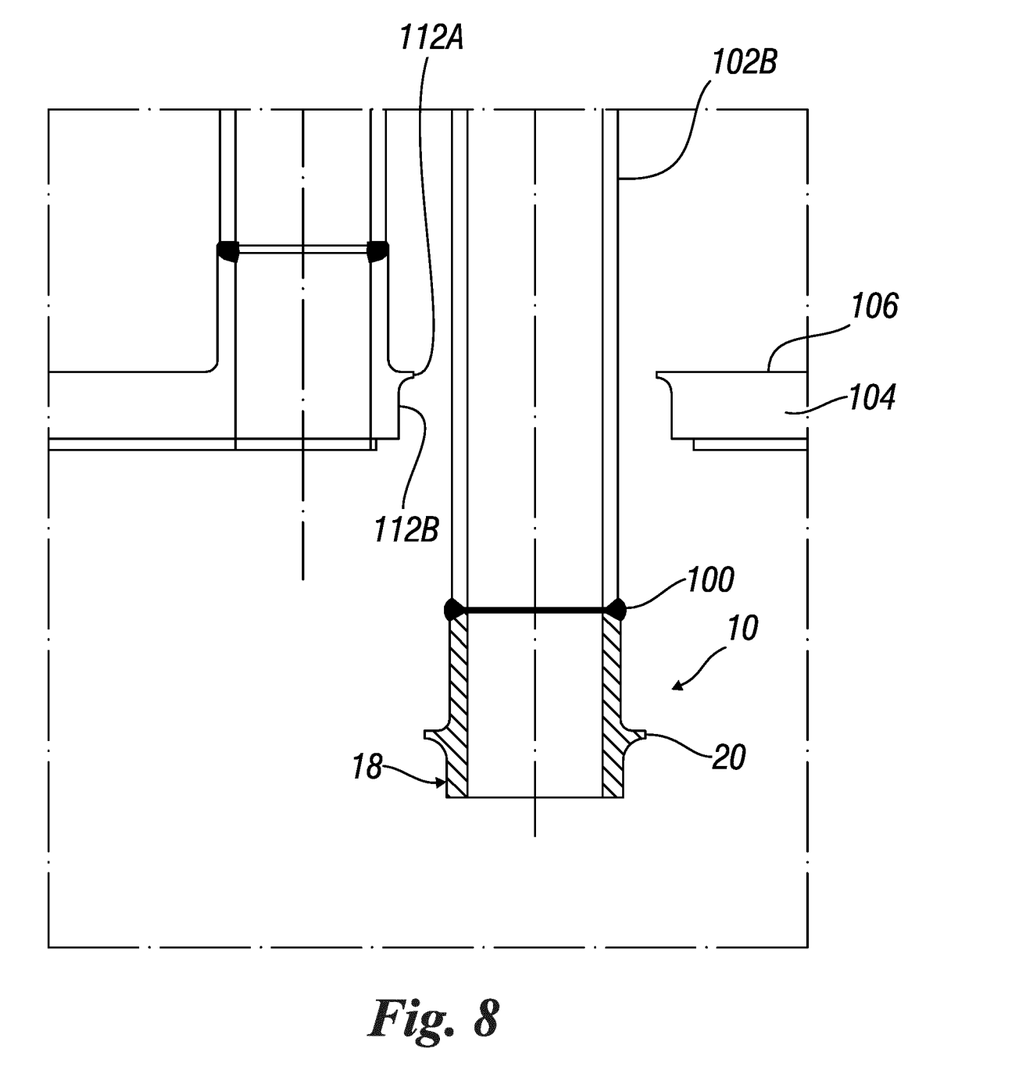
Figure 9:
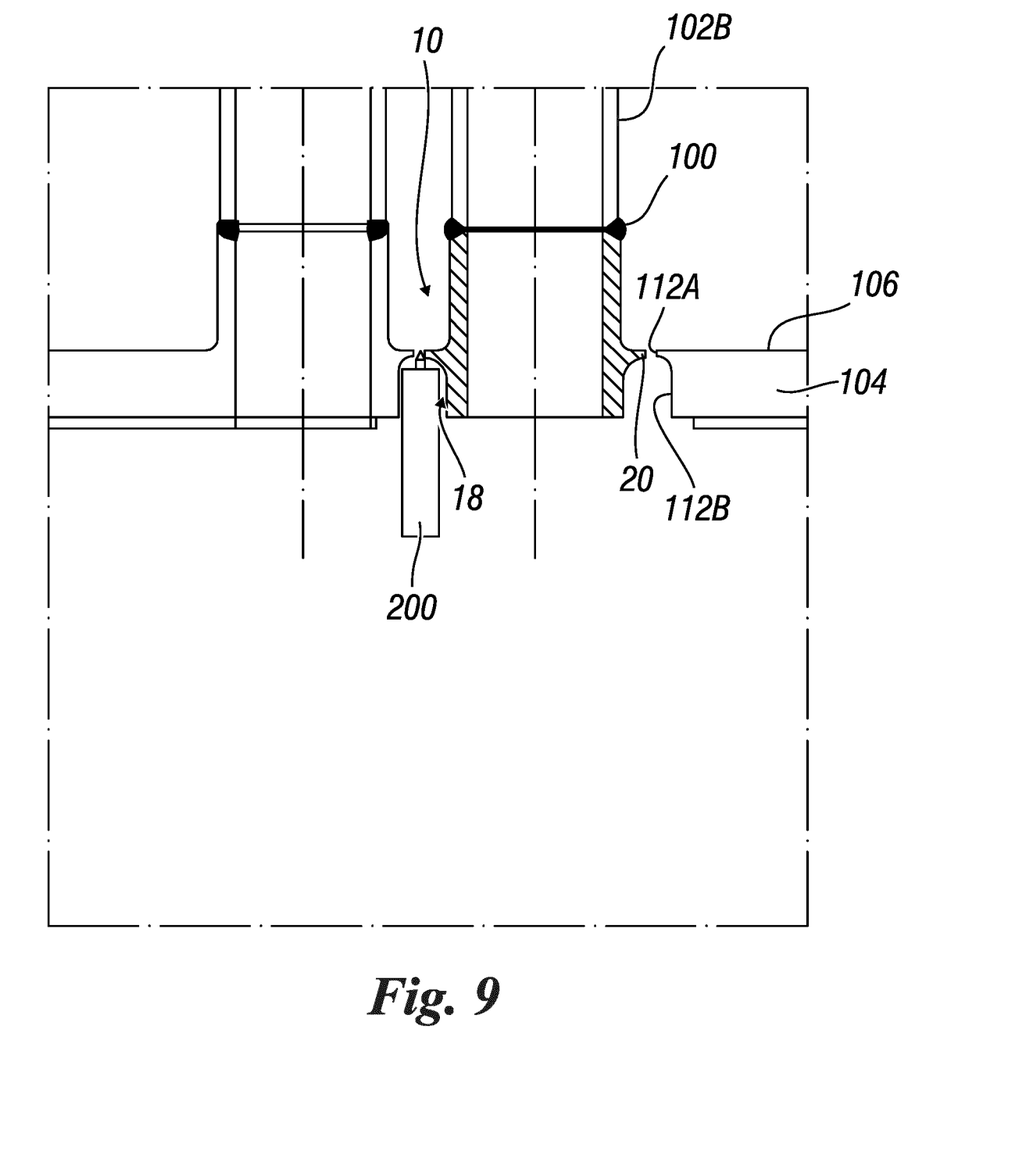

The new tube 102B is then butt-welded, at one end thereof, to the tubular connection element 10 (as shown in FIG. 8) before the insertion of said tubular connection element 10 into the through hole 112 obtained in the tube sheet 104. More precisely, the new tube 102B is butt-welded to the first connecting portion 16 of the tubular connection element 10. This tubular connection element 10, with the new tube 102B butt-welded thereto, is thus fitted up into this through hole 112 (as shown in FIG. 9).

Following this fit up operation, a cavity is obtained between the tubular connection element 10 and the through hole 112 of the tube sheet 104. More precisely, looking at FIGS. 4 and 5, it can be seen that this cavity is obtained between the shaped recess 22 of the tubular connection element 10 and the through hole 112 of the tube sheet 104. Due to the specific design of the shaped recess 22, this cavity has enough space for allowing the insertion therein of a conventional welding torch 200. A weld bead 130A, 130B, 130C is thus formed in said cavity using the welding torch 200, so as to obtain a strong and reliable root welding the connection element 10 and the tube sheet 104.

It should be pointed out that the above steps of the method for repairing damaged tube-to-tube sheet weld joints do not need to be performed in the sequence just described. For example, the new tube 102B can be butt-welded to the tubular connection element 10 even after the insertion of said tubular connection element 10 into the through hole 112 of the tube sheet 104.

If needed, after the old tube 102A removing step and before the new tube 102B inserting step at least one machining operation on the through hole 112 can be performed. This machining operation may be required so as to enlarge and/or to shape the through hole, thus facilitating the tubular connection element 10 fitting up step and/or the weld bead 130A, 130B, 130C forming step.

For example, as shown in FIGS. 9 to 13, this machining operation may be performed to fitted up the tubular connection element 10 into the through hole 112 in such a way that the radially projecting flange 20 is substantially aligned to the internal shell side 106 of the tube sheet 104, that is, the side of the tube sheet 104 from which all the tubes, and thus the new tube 102B, protrude. Additionally, or alternatively, this machining operation may be performed to form a through hole 112 with at least two different annular sections 112A, 112B, wherein the tubular connection element 10 is fitted up into the through hole 112 in such a way that its radially projecting flange 20 is substantially placed at a first annular section 112A with a smaller diameter, whereas its shaped recess 22 is substantially placed at a second annular section 112B with a greater diameter, thus enlarging as much as possible the space for the insertion of the welding torch 200 and effectively withstanding the welding stresses.

Figure 10:
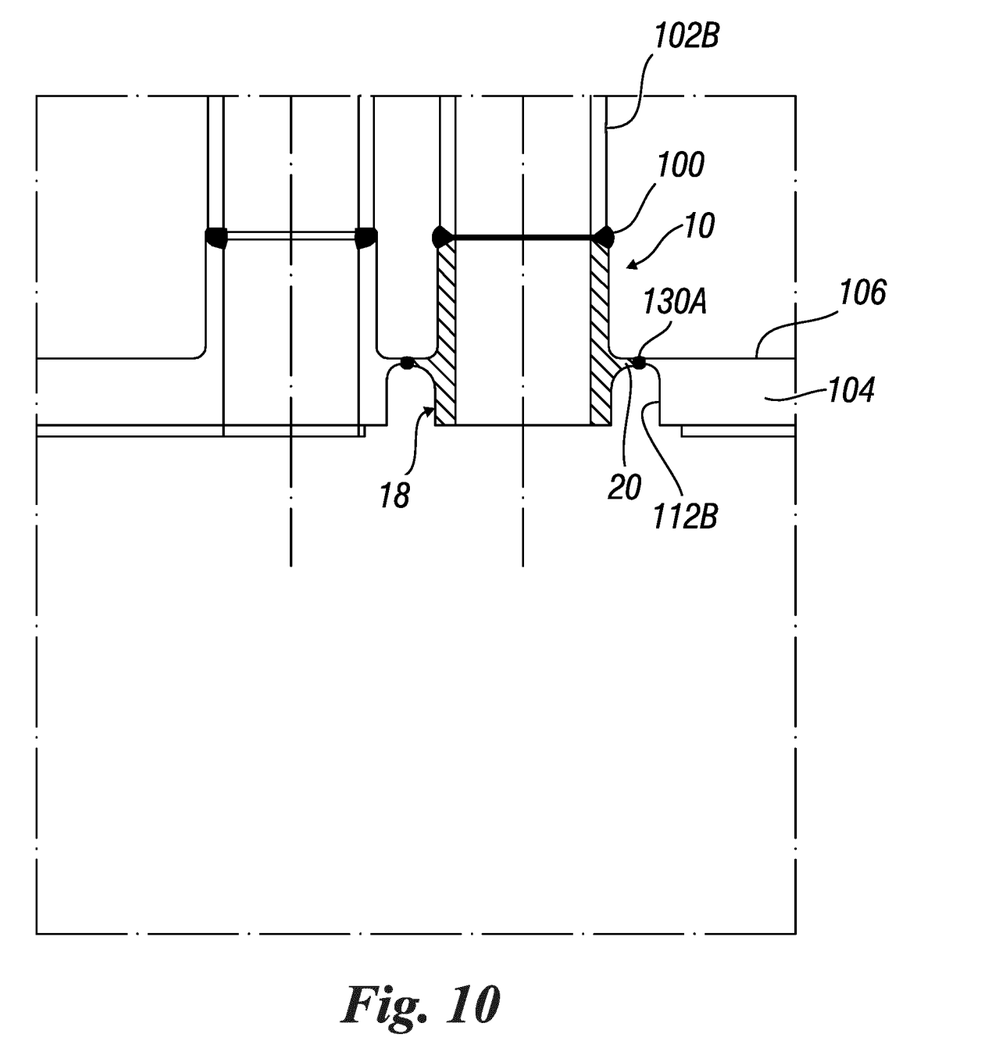
Figure 11:
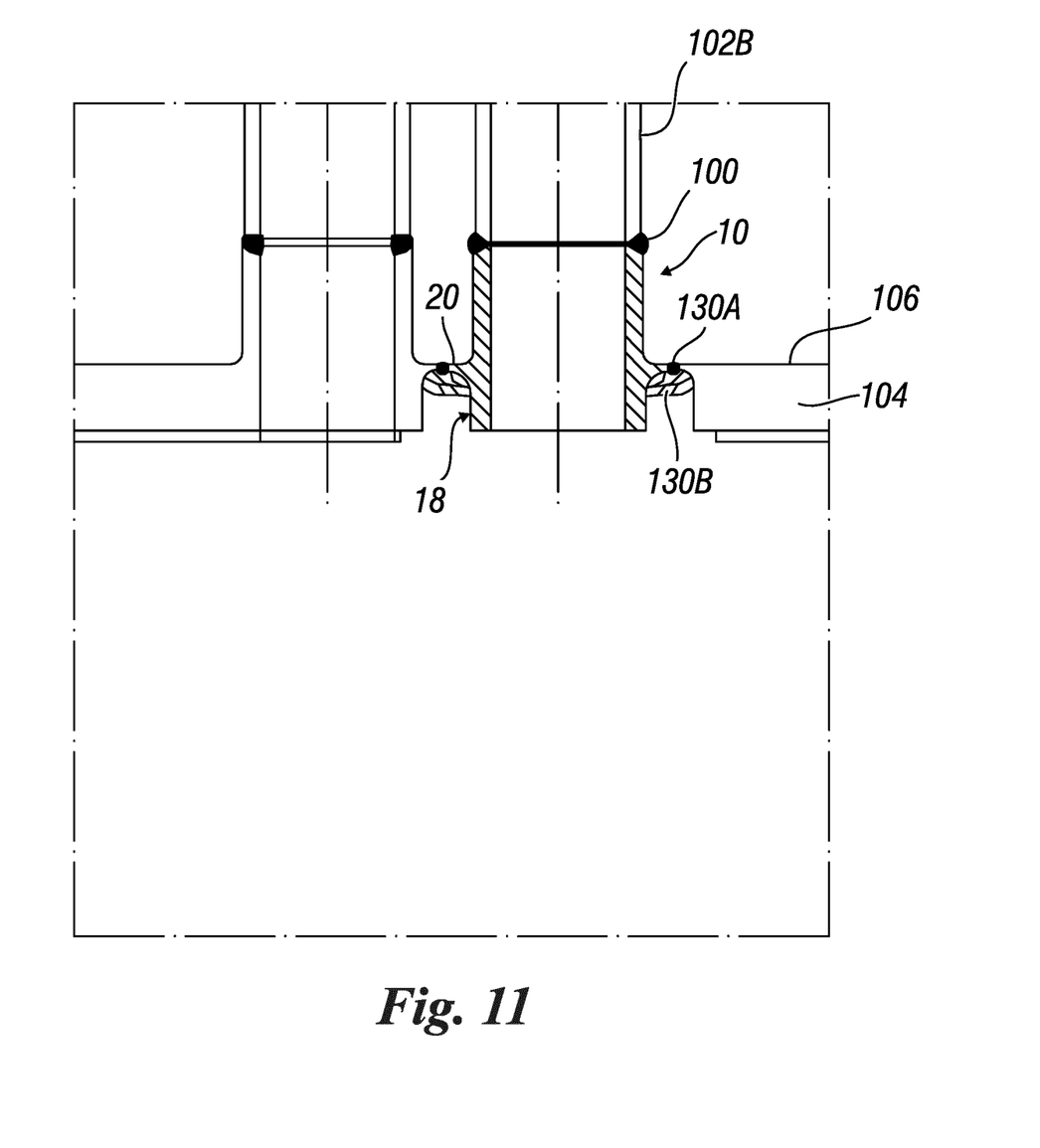
Figure 12:
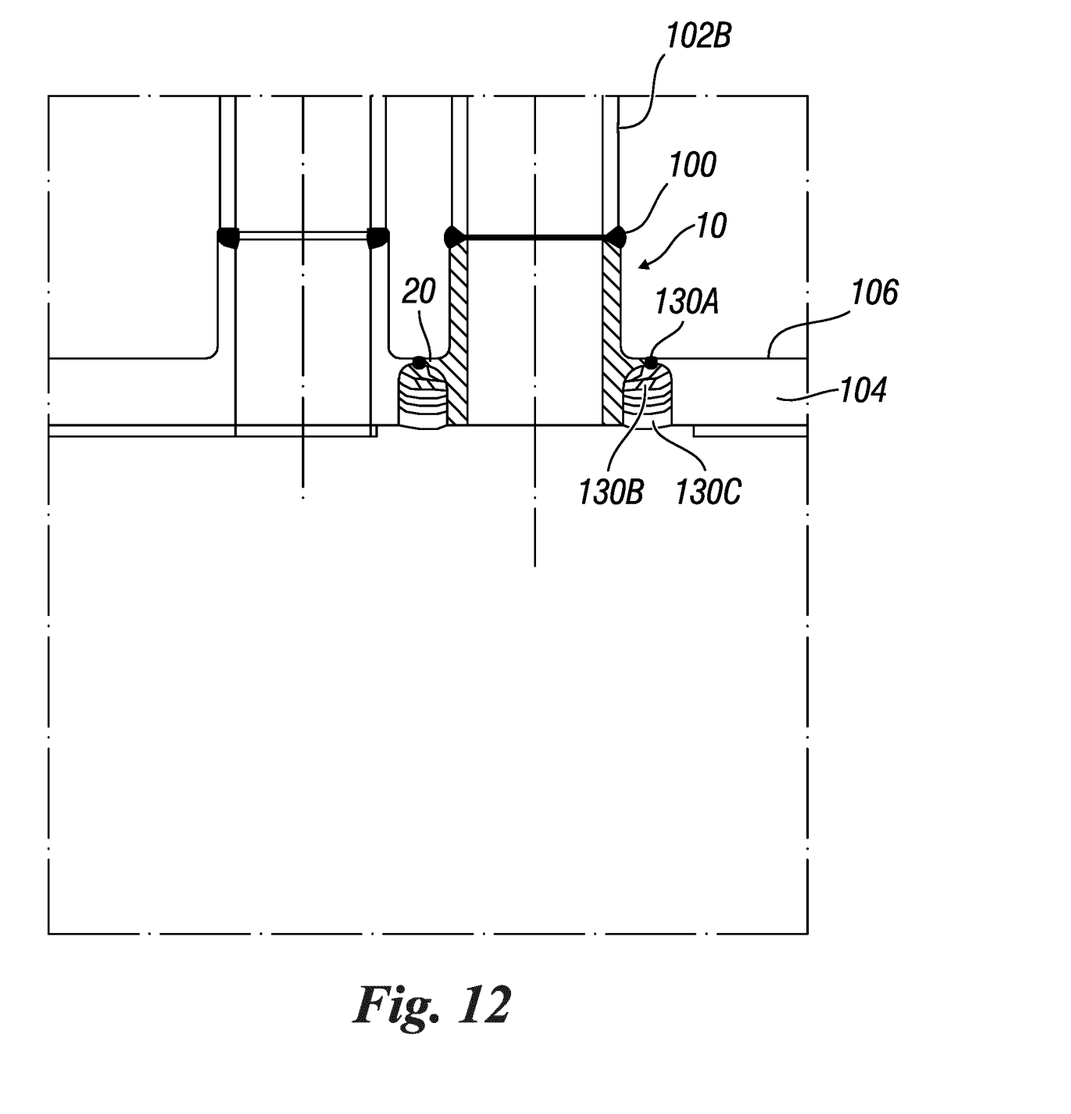

Preferably, according to the design of the tubular connection element 10 and the through hole 112 described so far, the weld bead 130A, 130B, 130C forming step may comprises a number of weld bead forming sub-steps, i.e.:

a first weld bead 130A forming sub-step (as shown in FIG. 10), wherein a first weld bead 130A is formed between the radially projecting flange 20 of the tubular connection element 10 and the first annular section 112A with a smaller diameter of the through hole 112;

at least one second weld bead 130B forming sub-step (as shown in FIG. 11), wherein at least one second weld bead 130B, having a thickness which is smaller than the thickness of the tube sheet 104, is formed between the shaped recess 22 of the tubular connection element 10 and the through hole 112 (for example, according to a preferred aspect of the weld bead 130A, 130B, 130C forming step, the thickness of the second weld bead 130B may be substantially equal to half the thickness of the tube sheet 104); and at least one third weld bead 130C forming sub-step (as shown in FIG. 12), wherein at least one third weld bead 130C is formed between the shaped recess 22 of the tubular connection element 10 and the through hole 112, in such a way that the whole weld bead 130A, 130B, 130C has a thickness which is substantially equal to the thickness of the tube sheet 104.

Figure 13:
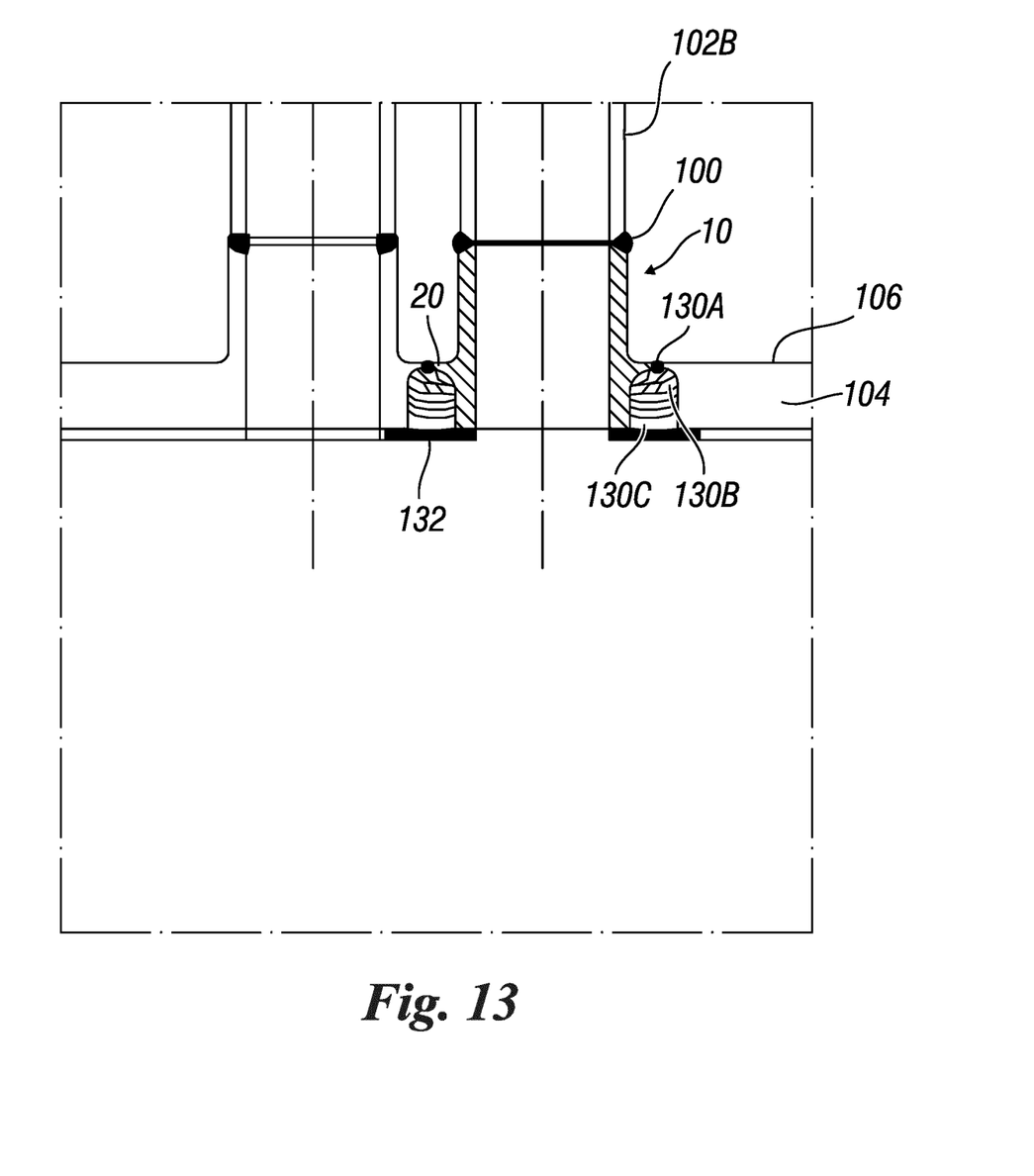

Preferably, several runs of the welding torch 200 may be required for performing each weld bead forming sub-step, so as to increase the root welding strength. Additionally, it should be noted that the number of weld bead forming sub-steps may vary (increase or decrease) according to the specific design of the tube sheet 104, for example according to the thickness of said tube sheet 104. Finally, the method may terminate with a final and conventional step of restoring the clad 132 (as shown in FIG. 13) that usually cover the so-called internal tube or channel side of the tube sheet 104, which is opposite to the internal shell side 106 (see FIG. 1) of said tube sheet 104.

It is thus seen that the device and the method for restoring the tube-to-tube sheet weld joints in a shell-and-tube equipment according to the present invention achieve the previously outlined objects. The device and the method according to the present invention can conveniently restore the tubeto-tube sheet butt-welded joints at least in the so called "thin walled" shell-and-tube equipment, i.e. shell-and-tube equipment with a tube sheet thickness lower than about 50 mm.

The device and the method for restoring the tube-to-tube sheet weld joints in a shell-and-tube equipment of the present invention thus conceived are susceptible in any case of numerous modifications and variants, all falling within the same inventive concept; in addition, all the details can be substituted by technically equivalent elements. In practice, the materials used, as well as the shapes and size, can be of any type according to the technical requirements.

The scope of protection of the invention is therefore defined by the enclosed claims.

The invention claimed is:

1. A device for repairing damaged tube-to-tube sheet weld joints in a shell-and-tube equipment, the device including a tubular connection element oriented along a central axial direction and comprising:
at least one inner surface, designed to enclose an inner conduit for the passage, along said central axial direction, of at least one fluid processed by said shell-and-tube equipment; and
at least one outer surface, surrounding said at least one inner surface,
wherein said tubular connection element is provided, at one end thereof, with at least one first connecting portion for connection, through a butt-welded joint, to one corresponding tube of said shell-and-tube equipment and, on one side thereof, with at least one second connecting portion for connection, through at least one weld bead, of said tubular connection element to at least one portion of the tube sheet of said shell-and-tube equipment, the at least one second connecting portion being integrally formed with the at least one first connecting portion,
wherein said at least one second connecting portion is provided with at least one radially projecting flange, designed to facilitate a root welding, through said at least one weld bead, between said tubular connection element and said tube sheet, said at least one radially projecting flange delimiting at least one shaped recess on said at least one outer surface for housing at least a part of said weld bead, and
wherein a bottom surface of the at least one radially projecting flange is a continuously curved surface in a radial direction from the outer surface to an end of the flange.

2. The device according to claim 1, wherein said at least one radially projecting flange is an annular flange that circumferentially surrounds said at least one second connecting portion.

3. The device according to claim 2, wherein said at least one shaped recess is an annular recess that circumferentially surrounds said at least one second connecting portion.

4. The device according to claim 3, wherein said radially projecting annular flange is integrally made in a single piece with said at least one outer surface.

5. The device according to claim 3, wherein said radially projecting annular flange is jointed to said annular recess through one curved wall of predefined radius.

6. The device according to claim 1, wherein said at least one radially projecting flange lies in a first plane that is substantially perpendicular to said central axial direction.

7. The device according to claim 1, wherein said at least one first connecting portion is upwardly inclined toward said central axial direction according to a predefined angle ($\alpha$), so as to form a notch at one end of said outer surface to facilitate the butt-welding between the tubular connection element and the tube.

8. The device according to claim 7, wherein said angle ($\alpha$) is defined between said first connecting portion and a second plane in which the upper end of said outer surface lies, said second plane being substantially perpendicular to said central axial direction.

9. The device according to claim 1, wherein said tubular connection element has a circular cross section.

10. The device according to claim 1, wherein said at least one inner surface is internally provided with at least one thickened portion, designed to sustain the welding pool and the welding stress.

11. The device according to claim 10, wherein said thickened portion is obtained in proximity of said one radially projecting flange and said at least one shaped recess, so as to increase the overall thickness of said tubular connection element at said one radially projecting flange and said at least one shaped recess.

12. A method for repairing damaged tube-to-tube sheet weld joints in a shell-and-tube equipment using at least one device including a tubular connection element oriented along a central axial direction,
the device comprising:
at least one inner surface, designed to enclose an inner conduit for the passage, along said central axial direction, of at least one fluid processed by said shell-and-tube equipment; and
at least one outer surface, surrounding said at least one inner surface,
wherein said tubular connection element is provided, at one end thereof, with at least one first connecting portion for connection, through a butt-welded joint, to one corresponding tube of said shell-and-tube equipment and, on one side thereof, with at least one second connecting portion for connection, through at least one weld bead, of said tubular connection element to at least one portion of the tube sheet of said shell-and-tube equipment,
the method comprising the steps of:
cutting an annular portion of the tube sheet, wherein said annular portion of the tube sheet surrounds at least a hub of one old tube to be replaced, so as to obtain a through hole in said tube sheet for the insertion of said tubular connection element;
removing the old tube from the shell-and-tube equipment;
inserting a new tube into the shell-and-tube equipment;
butt-welding said new tube, at one end thereof, to said tubular connection element;
fitting up said tubular connection element into said through hole; and
forming a weld bead in a cavity obtained between said tubular connection element and said through hole, so as to obtain a root welding between said tubular connection element and said tube sheet.

13. The method according to claim 12, wherein said new tube is butt-welded to the first connecting portion of said tubular connection element.

14. The method according to claim 12, wherein after the old tube removing step and before the new tube inserting step at least one machining operation on said through hole is performed, so as to enlarge and/or to shape said through hole for facilitating the tubular connection element fitting up step and/or the weld bead forming step.

15. The method according to claim 14, wherein said tubular connection element is fitted up into said through hole in such a way that at least one radially projecting flange provided on said at least one second connecting portion is substantially aligned to the internal shell side of the tube sheet.

16. The method according to claim 15, wherein said machining operation is performed to form a through hole with at least two different annular sections, wherein said tubular connection element is fitted up into said through hole in such a way that said at least one radially projecting flange is substantially placed at a first annular section with a smaller diameter, whereas at least one shaped recess, delimited by said at least one radially projecting flange, is substantially placed at a second annular section with a greater diameter.

17. The method according to claim 16, wherein the weld bead forming step comprises:
- a first weld bead forming sub-step, wherein a first weld bead is formed between said at least one radially projecting flange and said first annular section with a smaller diameter;
- at least one second weld bead forming sub-step, wherein at least one second weld bead, having a thickness which is smaller than the thickness of the tube sheet, is formed between said at least one shaped recess and said through hole; and
- at least one third weld bead forming sub-step, wherein at least one third weld bead is formed between said at least one shaped recess and said through hole, in such a way that the whole weld bead has a thickness substantially equal to the thickness of the tube sheet.

18. The device according to claim 8, wherein said angle (α) is between 20° and 40°.

19. The device according to claim 8, wherein said angle (α) is 30°.

20. The device according to claim 1, wherein the bottom surface of the at least one radially projecting flange has a first radius of curvature, and
wherein a top surface of the at least one radially projecting flange is joined to the at least one outer surface through a curve having a second radius of curvature, the second radius of curvature being smaller than the first radius of curvature.

21. The device according to claim 1, further comprising an upper edge and a lower edge,
wherein the at least one inner surface has a constant width between the upper edge and lower edge.

22. The device according to claim 1, wherein a top surface of the at least one radially projecting flange is a continuously curved surface in a radial direction from the outer surface to an end of the flange.

23. The device according to claim 1, further comprising an upper edge and a lower edge,
wherein the at least one radially projecting flange is in a horizontal plane, and
wherein the upper edge is at an acute angle to the horizontal plane.

* * * * *